United States Patent

[11] 3,604,958

[72] Inventor Oscar Palini
 Camp Springs, Md.
[21] Appl. No. 37,111
[22] Filed May 14, 1970
[45] Patented Sept. 14, 1971
[73] Assignee U.S. Research Corporation
 Washington, D.C.

[54] SENSING TRANSDUCER
 18 Claims, 4 Drawing Figs.
[52] U.S. Cl. .................................................. 310/8.1,
 310/8.5, 310/8.6, 310/9.2, 340/274, 340/280
[51] Int. Cl. ..................................................... H01v 7/00
[50] Field of Search ............................................. 310/8, 8.3,
 8.5, 9.1, 8.2, 9.2, 9.7, 8.1, 8.7, 8.6; 340/278, 279,
 280, 261, 274, 272, 258, 213

[56] References Cited
 UNITED STATES PATENTS
3,076,903 2/1963 Schwartz ....................... 310/8.3
3,067,296 12/1962 Heinlein ........................ 310/8.5 X
3,113,223 12/1963 Smith et al .................... 310/8.5
3,501,654 3/1970 Humphries .................... 310/9.1 X Primary Examiner—Milton O. Hirshfield
Assistant Examiner—B. A. Reynolds
Attorney—Finnegan, Henderson & Farabow ABSTRACT: An improved sensing transducer for use in a security device to protect objects from unauthorized removal is designed to sense both increases and decreases in pressure and to provide an output signal indicating that a pressure change has occurred. The sensing transducer includes a piezoelectric element and an actuator for transmitting pressure to the piezoelectric element to provide two different types of stress in the element. When an increase or decrease in pressure occurs, the piezoelectric element produces an output signal to indicate a change in pressure.

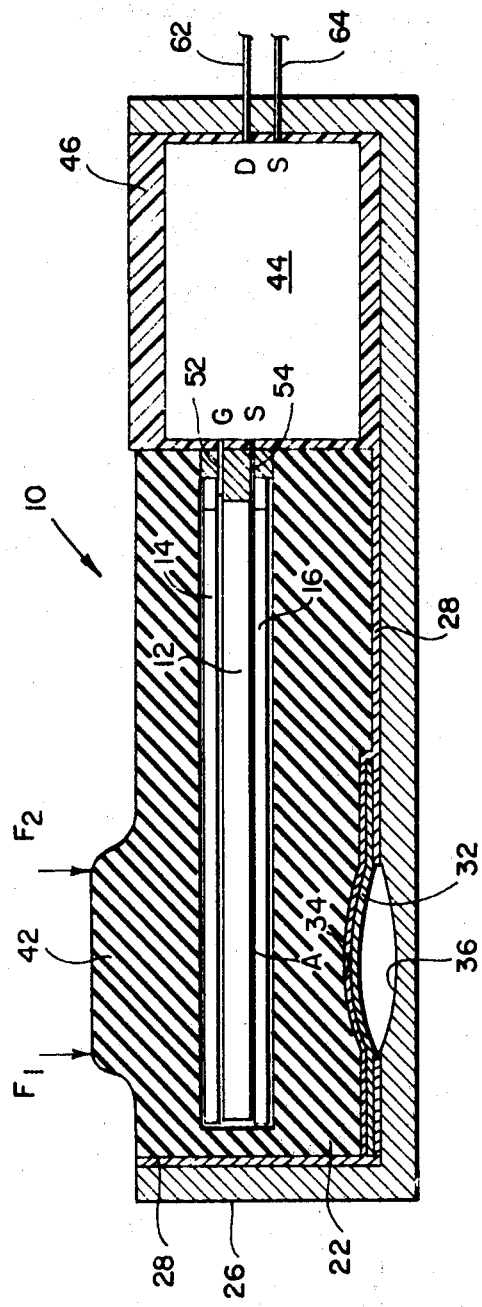

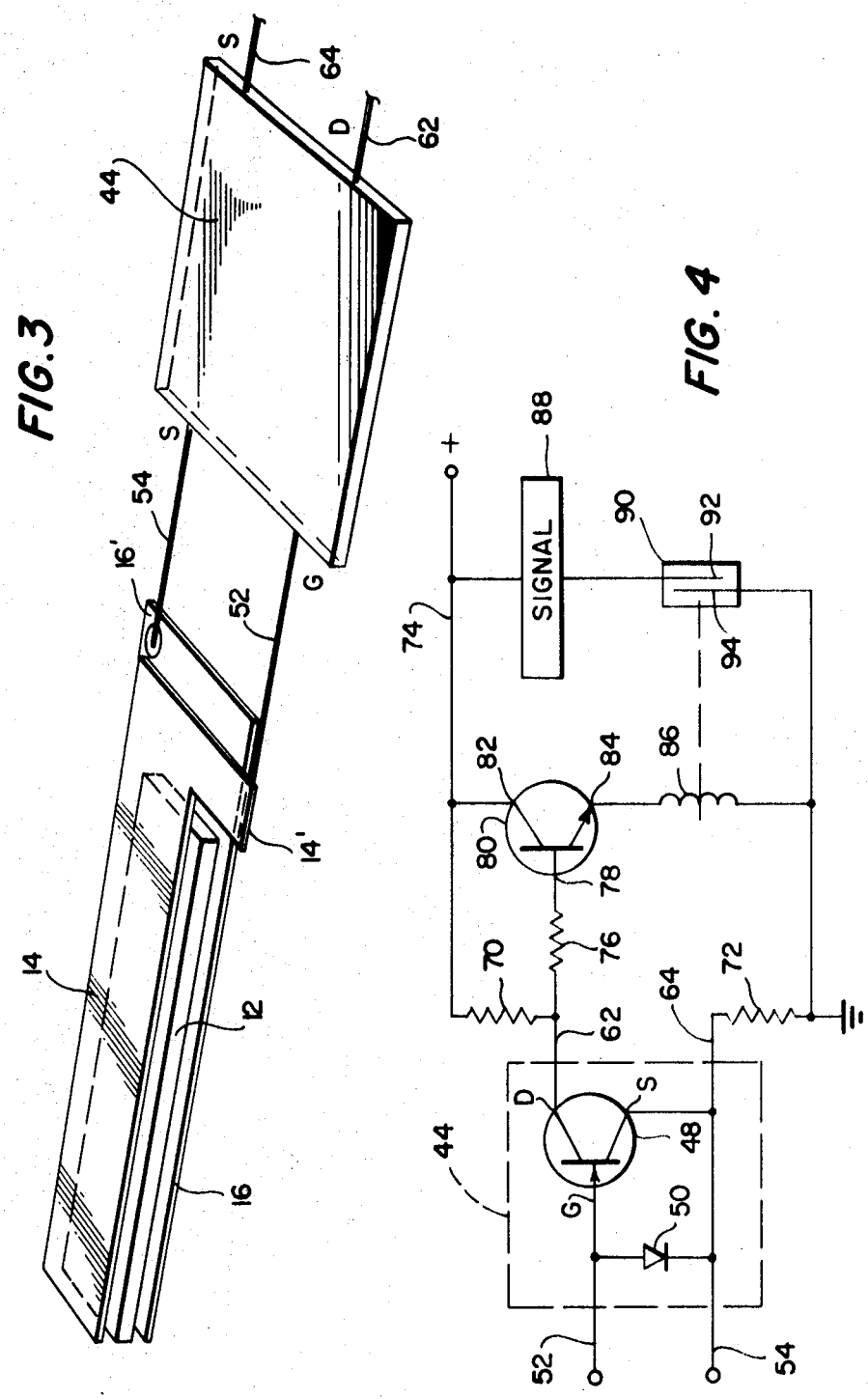

3,604,958

1

SENSING TRANSDUCER

The present invention relates to an improved transducer for sensing changes in mechanical pressure and, more particularly, to a piezoelectric transducer which provides an output signal in response to both increases and decreases in applied pressure.

In the prior art, piezoelectric transducers have been separately designed to respond to either increases or decreases in applied pressure. The prior art transducers included a piezoelectric element and an actuator for applying pressure to the element. Several examples of such transducers are disclosed in a copending application entitled "Sensing Transducer," Ser. No. 725,849, filed May 1, 1968. In the prior art transducers the orientation of the piezoelectric element determined whether the transducer responded to an increase or decrease in applied pressure. For a particular transducer design, it was possible to change the response of the transducer by reversing the orientation of the piezoelectric element with respect to the actuator of the transducer. It was not possible, however, to use the same transducer for sensing both increases and decreases in applied pressure.

The sensing transducer of the present invention eliminates the necessity of designing separate transducers for response to increases and decreases in pressure by providing an improved sensing transducer which produces an output signal in response to any change in pressure, i.e., either an increase or a decrease in pressure. The transducer of the present invention is particularly useful in security systems for protecting objects of value from unauthorized removal or for detecting unauthorized opening of a door or window. The transducer of the present invention may be used, for example, to protect a plurality of objects which are supported on a display surface. The transducer is placed in contact with the underside of the display surface to detect changes in pressure (increases or decreases in pressure) which occur when one or more objects is removed from the surface. One embodiment of the present invention is designed to produce an output signal for a predetermined time after a change in pressure is sensed upon the removal of an object from the surface. The output signal terminates after the predetermined time so that the transducer may be used to determine whether any additional objects are removed. Another embodiment of the invention is designed for detecting the unauthorized opening of a door.

In accordance with the invention a transducer for sensing a change in mechanical pressure and providing an output signal in response to the change in pressure is provided with a piezoelectric element for producing a voltage in response to a change in stress applied to the element and a pair of electrodes positioned on opposite sides of the element for sensing the voltage. The transducer is also provided with actuator means for transmitting pressure to the piezoelectric element to produce two different types of stress in the element so that upon an increase in pressure the piezoelectric element is stressed to produce a voltage which indicates a change in pressure.

In a preferred embodiment of the invention, the piezoelectric element is elongated and resilient support means extending the length of the piezoelectric element is provided. In addition, the preferred embodiment includes restraining means for limiting movement of the piezoelectric element at a fixed position along the element, and the actuator means transmits pressure to the piezoelectric element on opposite sides of the fixed position to produce two different types of stress in the element. Further, the preferred embodiment includes a housing in which the piezoelectric element, the electrodes, and the actuator means are mounted. A unidirectional current device, such as a field effect transistor, is also mounted within the housing and is connected to the electrodes so that the conduction of the current device is controlled by the voltage produced by a change in stress of the piezoelectric element.

2

The accompanying drawings illustrate a preferred embodiment of the invention and, together with the description, serve to explain the principles of the invention.

Of the drawing:

FIG. 1 is a front elevation, partially in section, of an improved sensing transducer including a housing, a hollow block of resilient material, a piezoelectric element, and a pair of electrodes constructed in accordance with the principles of the present invention;

FIG. 2 is a perspective view of the hollow block of resilient material of FIG. 1 illustrating a slot formed therein for receiving the piezoelectric element and pair of electrodes and also illustrating a protuberance formed on its upper surface for transmitting pressure to the piezoelectric element;

FIG. 3 is a perspective view of the piezoelectric element and electrodes which are inserted into the slot formed in the resilient block of FIG. 2 and an integrated circuit having input terminals connected to the electrodes; and FIG. 4 is a schematic diagram of a warning circuit which may be connected to the sensing transducer of this invention to provide a signal indicating that a change in pressure has been sensed by the transducer.

DESCRIPTION OF THE INVENTION

In FIG. 1 there is shown a transducer, generally 10, for sensing a change in mechanical pressure which is constructed in accordance with the principles of the present invention. The transducer may be used in a security device to protect objects from unauthorized removal.

In accordance with the invention the transducer includes a piezoelectric element for producing a voltage in response to a change in stress applied to the element. As embodied, transducer 10 includes an elongated piezoelectric element 12 (FIG. 3) which is rectangular in shape. Although any type of standard piezoelectric element may be used, in the preferred embodiment the element is manufactured by Clevite of Bedford, Ohio, under the name of PZT-5H-BIMORPH.

In accordance with the invention the transducer also includes a pair of electrodes positioned on opposite sides of the piezoelectric element for sensing the voltage produced upon a change in stress of the element. As shown in FIG. 1, transducer 10 is provided with a pair of electrodes positioned on opposite sides of piezoelectric element 12. Referring to FIG. 3, electrodes 14 and 16 are in the form of flat metal strips and have extensions 14' and 16' formed at the right-hand ends thereof to facilitate electrical connection to the electrodes. In the preferred embodiment, the electrodes are composed of a beryllium-copper alloy, or brass, having a silver coating applied thereto.

Referring to FIG. 1, the preferred embodiment of the transducer also includes a hollow block 22 of resilient material. In the preferred embodiment, block 22 is composed of silicone rubber. The block has an elongated slot 24 (FIG. 2) formed therein for receiving piezoelectric element 12 and electrodes 14 and 16. As shown in FIG. 1, the lower portion of block 22 provides a resilient support extending for the length of the piezoelectric element.

For purposes of illustration, electrodes 14 and 16 (FIG. 1) are shown as spaced from piezoelectric element 12. In the actual construction of the transducer of the present invention, the electrodes and piezoelectric element are held firmly together in slot 24 of resilient block 22. A thin coating of an insulating material, such as silicone grease, is also applied to the piezoelectric element prior to the positioning of the electrodes on opposite sides of the elements. A thin coating of silicone grease is also applied to the electrodes prior to their insertion into slot 24 formed in resilient block 22. After piezoelectric element 12 and electrodes 14 and 16 are inserted into slot 24 in the resilient block, the end of the slot is sealed by silicone cement. Since piezoelectric element 12 has a coating of silicone grease and is sealed inside block 22 of silicone rubber, the piezoelectric element is well insulated from external humidity and temperature changes which might affect its operation.

In a preferred embodiment of the invention, the transducer includes a housing. As here embodied, piezoelectric element 12, electrodes 14 and 16, and resilient block 22 are mounted in a housing 26. As shown in FIG. 1, resilient block 22 is bonded to the interior walls of housing 26 by a thin layer 28 of silicone cement. Preferably, the housing is constructed of a rigid material, e.g. metal or plastic.

In a preferred embodiment, the transducer is provided with restraining means for limiting movement of the piezoelectric element at a fixed position along the element. As embodied, the restraining means comprises a spring 32 in the form of a flexible metal band mounted on the bottom interior wall of housing 26. As shown in FIG. 1, spring 32 is located beneath resilient block 22 near one end of piezoelectric element 12. Spring 32 is bonded to the interior of housing 26 by silicone cement, and it has a raised or convex center portion which extends upward toward the piezoelectric element. Resilient block 22 has a concave opening 34 formed in its bottom surface for receiving the convex portion of spring 32. Housing 26 is provided with a concave depression 36 for receiving the convex portion of spring 32 when it is flexed downward.

The convex portion of spring 32 acts through the resilient material of the lower portion of block 22 to provide additional support for piezoelectric element 12 at a point A (FIG. 1) intermediate between the ends of the piezoelectric element. Point A is located at a position over the approximate center of the convex portion of spring 32. Thus, the convex portion of the spring provides a position along the piezoelectric element about which the element may be flexed to apply stress to the element.

In accordance with the invention the transducer is provided with actuator means for transmitting pressure to the piezoelectric element to produce two different types of stress in the element, so that upon an increase or decrease in pressure the element is stressed to produce a voltage indicating a change in pressure. In the preferred embodiment, the actuator means comprises a protuberance 42 (FIGS. 1 and 2) formed as an integral part of resilient block 22. As shown in FIG. 2, protuberance 42 is elongated in shape and extends along the upper surface of block 22 in a direction parallel to the piezoelectric element. It is located over the convex portion of spring 32 and protrudes above housing 26. The protuberance is formed of the same material, silicone rubber, as resilient block 22. As further shown in FIG. 1, upper surface of block 22 is located slightly below the top edge of housing 26.

Protuberance 42 transmits pressure to the piezoelectric element to produce two different types of stress in the element. The different types of stress may be more clearly understood by considering the operation of the transducer under the application of external forces to the protuberance. If, for example, a force $F_1$ is applied to the left end of protuberance 42 (FIG. 1) a pressure is transmitted through the resilient material block 22 to piezoelectric element 12 at a point located to the left of point A, i.e., the approximate center of the convex portion of spring 32. The pressure applied to piezoelectric element 12 as a result of force $F_1$ tends to flex the left end of the piezoelectric element downward. The opposite end of piezoelectric element 12 is confined in the right-hand portion of slot 24 of resilient block 22 to resist both upward and downward motion. Since downward movement of piezoelectric element 12 is limited by spring 32 at point A, the piezoelectric element is flexed into a convex upward shape by force $F_1$. The piezoelectric element is arranged to produce a positive voltage on electrode 14 in response to increases in force $F_1$, which flex the piezoelectric element into a more convex shape.

If, on the other hand, a force $F_2$ is applied to the right end of protuberance 42, a pressure is transmitted through the resilient material of block 22 to piezoelectric element 12 at a point located to the right of point A. Since downward movement of piezoelectric element 12 at point A is limited by spring 32 and since, as explained above, the right-hand portion of piezoelectric element 12 resists both upward and downward motion in slot 24 of resilient block 22, the piezoelectric element is flexed into a concave upward shape by force $F_2$. The piezoelectric element produces a positive voltage on electrode 14 in response to decreases in force $F_2$ which flex the piezoelectric element into a less concave, or more convex, shape.

In the situation where both forces $F_1$ and $F_2$ are applied to protuberance 42, piezoelectric element 12 is flexed in two directions to produce two different types of stress piezoelectric element. In the normal operation of the transducer, as explained below, the forces applied to protuberance 42 are uniformly distributed over the entire upper surface of the protuberance. The effect of the uniformly distributed forces on the operation of piezoelectric element 12 is the same, however, as in the situation described above where two separate forces $F_1$ and $F_2$ are applied at opposite ends of protuberance 42. The piezoelectric element produces a positive voltage in the event that there is either an increase in force $F_1$ or a decrease in force $F_2$.

In a preferred embodiment of the invention, the transducer includes a unidirectional current device mounted within its housing. As shown in FIG. 1, a unidirectional current device 44 encased in a coating 46 of s synthetic organic resin material, such as an epoxy resin, is mounted within housing 26.

Unidirectional current device 44 is shown schematically in FIG. 4. In a preferred embodiment of the invention, the unidirectional current device includes a field effect transistor 48 having a gate electrode G for controlling the conduction of current from its drain electrode D to its source electrode S. In the preferred embodiment, field effect transistor 48 is formed as a part of an integrated circuit which includes a diode 50 connected between gate electrode G and source electrode S of the transistor. The purpose of diode 50 is described below.

Referring to FIGS. 1 and 3, electrode 14 is connected to gate electrode G of unidirectional current device 44 by a conductor 52 which is attached to extension 14' formed at the right-hand portion of electrode 14. Similarly, electrode 16 is connected to source electrode S of the unidirectional current device by a conductor 54 which is attached to extension 16' formed at the right-hand portion of electrode 16. In the operation of the transducer, the voltage produced by a change in stress of piezoelectric element 12 is sensed by electrodes 14 and 16 and applied to input terminals, i.e., gate electrode G and source electrode S, of the unidirectional current device.

The transducer is provided with a set of conductors 62 and 64 which extend through housing 26 and are connected to output terminals, i.e., drain electrode D and source electrode S, respectively, of the unidirectional current device. The conductors may be connected to a warning circuit (FIG. 4) which provides an output signal to indicate that a change in pressure is sensed by the transducer.

The purpose of mounting unidirectional current device 44 inside housing 26 is to prevent the transducer and warning circuit from being ineffective in the event that conductors 62 and 64 are cut. As explained below, the unidirectional current device is normally conducting and a decrease in the amount of current conducted through the current device activates the warning circuit. Since the cutting of conductors 62 and 64 would result in a decrease in the amount of current conducted through the current device, it would also result in the activation of the warning circuit to produce an output signal.

Referring to FIG. 4, conductors 62 and 64 of the transducer are connected to a suitable warning circuit which is similar to the circuit disclosed in the copending application entitled "-Sensing Transducer," Ser. No. 725, 849, filed May 1, 1968. The warning circuit is provided with a pair of biasing resistors 70 and 72 which are connected to drain electrode D and source electrode S, respectively, of field effect transistor 48. Resistor 70 is also connected to a power supply line 74, and resistor 72 is connected to ground. Drain electrode D of the field effect transistor is also connected through a resistor 76 to a base electrode 78 of an NPN semiconductor transistor 80. Collector electrode 82 of transistor 80 is connected to power supply line 74. Emitter electrode 84 of transistor 80 is connected to one end of a magnetic coil 86, and the opposite end of coil 86 is connected to ground. The warning circuit also includes a signal device 88 having one of its terminals connected to power supply line 74. The other terminal of signal device 88 is connected to a magnetic reed switch 90. The magnetic reed switch has a pair of normally open contacts 92 and 94. Contacts 92 and 94 are closed when coil 86 is energized to produce a magnetic field in the vicinity of magnetic reed switch 90. When contacts 92 and 94 are closed, a conducting path for signal device 88 from power supply line 74 to ground is completed and the signal device provides an output signal indicating that the change in pressure has been sensed.

OPERATION

Considering first the operation of the warning circuit of FIG. 4, it is assumed that the transducer in its initial state does not detect any change in pressure so that no voltage is applied on conductors 52 and 54 to the input terminals of unidirectional current device 44. In this situation, field effect transistor 48 conducts a predetermined leakage current from its drain electrode D to its source electrode S. The warning circuit is designed to provide a small input voltage to transistor 80 when field effect transistor 48 is conducting leakage current. The small input voltage to transistor 80 is not sufficient to bias the transistor into conduction so that the transistor is initially in a nonconducting state. As a result, there is no current flow through magnetic coil 86 to produce a magnetic field and contacts 92 and 94 of magnetic reed switch 90 remain in their normally open positions. Signal device 88 produces no output signal at this time.

When a change in pressure is sensed by the transducer, a voltage is applied via conductor 52 to gate electrode G of filed effect transistor 48. This voltage changes the biasing level of field effect transistor 48 such that the amount of current conducted through drain electrode D and source electrode S is decreased. The decrease in current through field effect transistor 48 results in an increase in the input voltage applied through resistor 76 to base electrode 78 of transistor 80. The increased input voltage to base electrode 78 biases transistor 80 into a conducting state and current flows from power supply line 76 through transistor 80 into magnetic coil 86. The magnetic coil produces a magnetic field which closes the normally open contacts 92 and 94 of magnetic reed switch 90. Upon the closing of contacts 92 and 94, signal device 88 produces an output signal indicating that the transducer has sensed a change in pressure.

In the operation of the warning circuit, diode 50 (FIG. 4) permits 78 charge 80 on electrodes 14 and 16 (FIG. 1) of the transducer upon a change in stress of piezoelectric element 12 to be dissipated at a faster rate than if all the accumulated charge was dissipated through gate electrode G of field effect transistor 48. Diode 50 provides a path of conduction for the charge accumulated on electrodes 14 and 16 which is an alternative to the conducting path through gate electrode G of the field effect transistor. When a charge appears on electrodes 14 and 16 as a result of a change in stress in piezoelectric element 12, current flows through diode 50 and through gate electrode G to source electrode S of field effect transistor 48. Diode 50 allows the entire charge accumulated on electrodes 14 and 16 to be dissipated after a predetermined time. After the charge is dissipated, filed effect transistor 48 returns to its initial state where it conducts a predetermined leakage current. Transistor 80 is then biased into a nonconducting state and the output signal provided by signal device 88 is terminated. Thus, the transducer and its associated warning circuit becomes capable of sensing a subsequent change in pressure applied to the transducer and providing an output signal to indicate the subsequent change in pressure. This feature of the invention is particularly useful in a situation in which it is desirable to protect a plurality of objects by using one transducer, e.g., where a plurality of objects are arranged on a single display surface. Since the transducer is capable of detecting separate changes in pressure which occur at different times, it may be used to sense the removal of more than one object from the display surface.

Considering the operation of the transducer of FIG. 1 as a security device to protect an object from unauthorized removal, the object to be protected is placed in contact with protuberance 42 of resilient block 22. During the initial loading of the transducer by placing the object in contact with protuberance 42, the transducer will provide a voltage across electrodes 14 and 16 due to the change in stress applied to piezoelectric element 12. To avoid an output signal from signal device 88 (FIG. 4) the power supply for the warning circuit may be cutoff at this time. After the initial loading of the transducer and the dissipation of the accumulated charge on electrodes 14 and 16 through diode 50 (FIG. 4), the power supply may be turned on without producing an output signal from signal device 88.

After the initial loading of the transducer, the weight of the object is uniformly distributed over the upper surface of protuberance 42 so that pressure is transmitted through the resilient material of block 22 to piezoelectric element 12 at points on both side of point A, i.e., the approximate center of the convex portion of spring 32. As previously explained, the effect of applying a uniformly distributed force to protuberance 42 is to produce two different types of stress in the piezoelectric element. Any disturbance of the protected object which results in an increase or decrease in the pressure transmitted to piezoelectric element 12 produces a positive voltage across electrodes 14 and 16 which is applied to gate electrode G of field effect transistor 48. The positive voltage decreases the conductivity of the field effect transistor to bias transistor 80 into a conducting state. A current flow occurs through magnetic coil 86 to operate magnetic reed switch 90 and provide an output signal from signal device 88 to indicate that a change in pressure has occurred.

In most instances where the transducer is used to protect an object which is placed on protuberance 42, it is desirable that the protuberance not be completely depressed by the weight of the object to avoid having the object rest upon housing 26. This result is achieved by varying the resiliency of the material of block 22 in accordance with the weight of the object to be protected by the transducer. In most instances it is also desirable to avoid complete depression of the convex portion of spring 32 in the operation of the transducer. To accomplish this result, the thickness of the flexible metal band of spring 32 may also be varied in accordance with the weight of the object.

In some instances however, where the transducer of the present invention is used in a security device, it is desirable that protuberance 42 and the convex portion of spring 32 be completely depressed in the operation of the transducer. If, for example, the transducer is used to detect the opening of a door in a building, it is preferred that protuberance 42 be completely depressed when the door is closed so that the surface of the door which contacts the protuberance also makes contact with housing 26. In this instance, complete depression of protuberance 42 is desired to avoid spurious operation of the transducer and warning circuit by vibrations applied to the door as a result of vibration-producing disturbances such as a passing truck, a thunderstorm, or a heavy object being dropped on the floor of the building.

When the transducer is used to detect the opening of a door, it is also desirable that the convex portion of spring 32 be completely depressed into concave depression 36 (FIG. 1) when the door is closed. Thereafter, upon the opening of the door, the convex portion of spring 32 snaps into its original position thereby producing a change in stress of piezoelectric element 12 which results in a voltage across electrodes 14 and 16 to operate the warning circuit.

The convex portion of spring 32 serves two functions in the operation of the transducer. First, in its normal position the convex portion of spring 32 provides a fixed point (point A) about which piezoelectric element may be flexed and, second, when the convex portion of spring 32 is completely depressed under the application of forces to protuberance 42, it insures that an output signal is produced by the transducer when the applied force is released. In detecting the unauthorized opening of a door, for example, the second function of spring 32 prevents an intruder from avoiding detection by opening the door so gradually that the voltage produced by the piezoelectric element is insufficient to operate the warning circuit.

The present invention provides a new and improved transducer for sensing changes in mechanical pressure which is particularly useful in security systems. The transducer is capable of providing an output signal in response to both increases and decreases in mechanical pressure. The transducer has a wide range of applications and, in addition to being used in situations where it is desirable to detect both increases and decreases in pressure, it may also be used in situations where the transducers of the prior art were employed to sense only increases or decreases in pressure.

The invention in its broader aspects is not limited to the specific details shown and described and modifications may be made in the details of the transducer without departing from the principles of the present invention.

What is claimed is:

1. A transducer for sensing a change in mechanical pressure and providing an output signal in response to the change in pressure, which comprises:

a piezoelectric element for producing a voltage in response to a change in stress applied to said element;

a pair of electrodes positioned on opposite sides of said piezoelectric element for sending the voltage; and actuator means for transmitting pressure to said piezoelectric element to produce two different types of stress in said element so that upon an increase or decrease in pressure said element is stressed to produce a voltage indicating a change in pressure.

2. The transducer of claim 1, wherein:

said piezoelectric element is elongated; and which includes a resilient support extending the length of said piezoelectric element for supporting said element.

3. The transducer of claim 2, which includes:

restraining means for limiting movement of said piezoelectric element at a fixed position along said element; and wherein said actuator means transmits pressure to said piezoelectric element on opposite sides of said fixed position to produce two different types of stress in said element.

4. The transducer of claim 3, which includes:

a housing, and wherein said restraining means includes a spring mounted on the interior of said housing at one end of said element.

5. The transducer of claim 1, which includes:

a housing; and a unidirectional current device mounted within said housing and having a gate electrode for controlling the conduction of said current device, said gate electrode connected to one of said pair of electrodes so that the conduction of said current device is controlled by the voltage produced by a change in stress of said piezoelectric element.

6. A transducer for sensing a change in mechanical pressure and providing an output signal in response to the change in pressure, which comprises:

a housing;

an elongated piezoelectric element located within said housing for producing a voltage in response to a change in stress applied to said element;

a resilient support located within said housing for supporting said piezoelectric element;

a pair of electrodes positioned on opposite sides of said piezoelectric element for sensing the voltage produced upon a change in stress of said element;

restraining means for limiting movement of said piezoelectric element at a point intermediate between the ends of said element; and actuator means for transmitting pressure to said piezoelectric element at points on opposite side of said intermediate point to stress said element in two directions so that when said pressure is increased or decreased said element produces a voltage to indicate a change in pressure.

7. The transducer of claim 6, wherein:

said resilient support comprises an elongated block of resilient material mounted within said housing and having an elongated slot formed therein for receiving said piezoelectric element; and said restraining means includes a spring mounted on the interior of said housing beneath said block of resilient material.

8. The transducer of claim 7, wherein:

said spring is a flexible metal band having a convex center portion for providing support at said piezoelectric element at a position located over the approximate center of said convex portion.

9. The transducer of claim 6, wherein:

said resilient support comprises an elongated hollow block of resilient material located within said housing for receiving and supporting said piezoelectric element; and said actuator means comprises a protuberance formed on said block of resilient material and protruding outward from said housing.

10. The transducer of claim 9, wherein:

said protuberance formed on said block of resilient material is elongated and extends in a direction parallel to piezoelectric element so that pressure applied to said protuberance is transmitted to said element at points on opposite sides of said intermediate point.

11. The transducer of claim 7, wherein:

said pair of electrodes are elongated and are inserted in said slot formed in said block of resilient material on opposite sides of said piezoelectric element.

12. The transducer of claim 6, which includes:

a unidirectional current device mounted within said housing and having (1) a set of output terminals and (2) a gate electrode for controlling the conduction of said current device through said output terminals, said gate electrode connected to one of said pair of electrodes to sense the voltage produced by a change in stress of said piezoelectric element; and a set of conductors extending through said housing and connected to said output terminal of said current device for connection to a warning circuit to indicate that a change in pressure is sensed by the transducer.

13. The transducer of claim 12, wherein:

said unidirectional current device comprises a field effect transistor having gate, drain, and source electrodes, and said gate electrode connected to one of said pair of electrodes and said drain and source electrodes connected to said conductors extending through said housing.

14. The transducer of claim 13, which includes:

a diode connected between the gate and source electrodes of said field effect transistor for providing an alternative conducting path for the charge which appears on said pair of electrodes when a change in stress is applied to said piezoelectric element.

15. The transducer of claim 14, wherein:

said field effect transistor and said diode are combined as an integrated circuit.

16. A transducer for use in a security device to protect an object from unauthorized removal by sensing a change in pressure which occurs as a result of any disturbance of the object and providing an output signal to indicate the change in pressure, which comprises:

a piezoelectric element for producing a voltage in response to a change in stress applied to said element;

a pair of electrodes positioned on opposite sides of said piezoelectric element for sensing the voltage; and actuator means for contacting the object to be protected and transmitting pressure from the object to said piezoelectric element to produce two different types of stress in said element so that upon an increase or decrease in pressure said element is stressed to produce a voltage indicating a change in pressure.

17. The transducer of claim 16, wherein:

said piezoelectric element is elongated; and which includes a hollow block of resilient material having an elongated slot formed therein for receiving said piezoelectric element; and restraining means for limiting movement of said piezoelectric element at a point intermediate between the ends of said element.

18. The transducer of claim 17, wherein:

said actuator means comprises a protuberance formed as an integral part of said block of resilient material for contacting the object to be protected and transmitting pressure from the object to said element at points on opposite sides of said intermediate point.